T. H. KENNEY.
MIXING VALVE.
APPLICATION FILED NOV. 20, 1913.
1,148,455. Patented July 27, 1915.
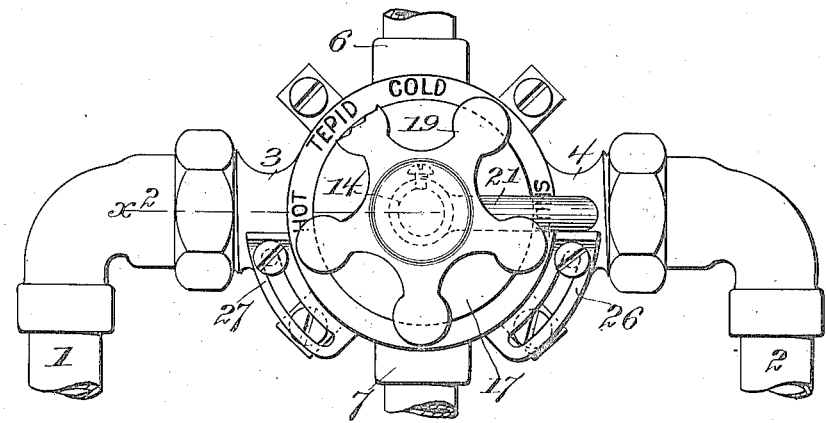
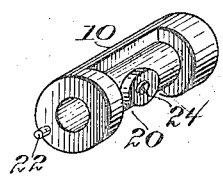 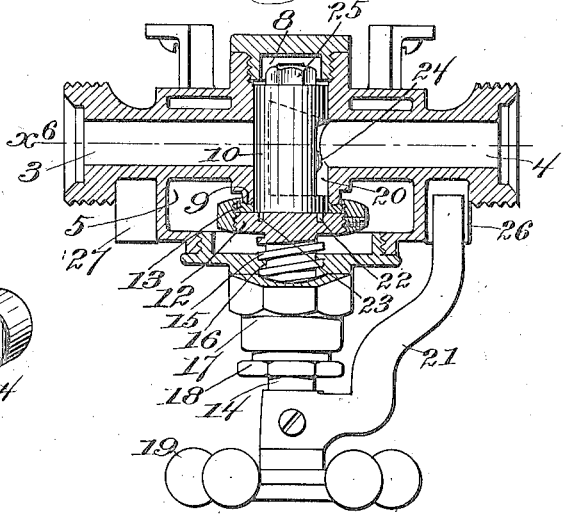 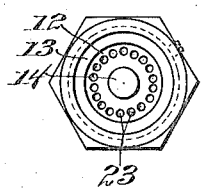
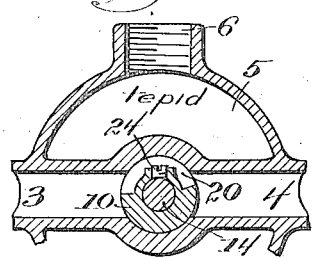 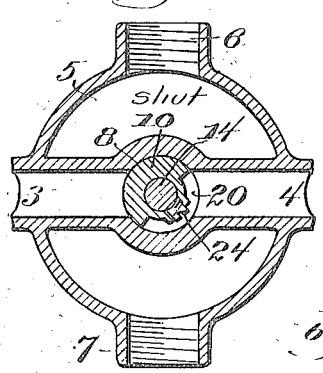 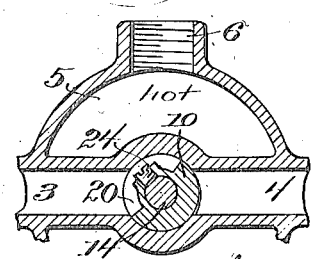
Witnesses:
Jas. J. Maloney
M. L. Maloney
Inventor:
Thomas H. Kenney,
by H. P. Livermore, Atty.

UNITED STATES PATENT OFFICE.

THOMAS H. KENNEY, OF BOSTON, MASSACHUSETTS, ASSIGNOR TO DALTON-INGERSOLL MANUFACTURING COMPANY, A CORPORATION OF MASSACHUSETTS.

MIXING-VALVE.

1,148,455.  Specification of Letters Patent.  Patented July 27, 1915.

Application filed November 20, 1913.  Serial No. 802,062.

*To all whom it may concern:*

Be it known that I, THOMAS H. KENNEY, a citizen of the United States, residing in Boston, in the county of Suffolk and State of Massachusetts, have invented an Improvement in Mixing-Valves, of which the following description, in connection with the accompanying drawings, is a specification, like letters on the drawings representing like parts.

The present invention relates to a mixing valve of the kind which is utilized in connection with baths, showers, and the like, to control the mixture of hot and cold water in order to get the temperature desired at the outlet.

The invention is shown as embodied in a valve having hot and cold water inlets and two outlets, one of which supplies an overhead shower, and the other a spray pipe.

In accordance with the invention the water is shut off by means of a compression cock having a washer which is forced against an annular seat by turning a screw threaded handle in the usual way, the valve member being provided, however, with a water controlling member which affords a supplemental control of the flow of water from the hot and cold water inlet pipes, the control being responsive to the turning movement of the valve which unseats the main outlet.

The invention consists mainly in certain details of construction and arrangement whereby adjustments can be made to suit the conditions, so that the valve, when installed, can be arranged to take care of the normal conditions which vary in different systems, as to the differences of pressure of the hot and cold water, the usual maximum temperature of the hot water, &c. The valve, moreover, is provided with adjustable stops which control the full movement of the valve, the stop which is engaged when the valve is shut being adjusted so that it will be engaged when the compression cock is tight, thereby preventing the jamming of the valve washer by a further movement of the handle; while the adjustable stop at the opposite end controls the hot water inlet, and provides means for throttling said hot water inlet to some extent if the usual hot water supply is abnormally hot, so that it is undesirable to admit the water under full volume.

Figure 1 is a front elevation of a valve embodying the invention shown as adapted to be secured to the wall adjacent to a tub or shower room. Fig. 2 is a horizontal section, on the line $x^2$ of Fig. 1. Fig. 3 is a perspective view of the mixing member separated from the other parts. Fig. 4 is a detail showing a face of the valve seat portion of the valve proper and indicating the means for retaining the mixing member in its proper adjustment; and Figs. 5, 6, and 7 are sectional views on the line $x^6$ of Fig. 2, showing the valve in different positions.

In accordance with the invention, the hot and cold water pipes 1 and 2 are coupled to inlet passages 3 and 4 formed in the main part of the valve, the interior of which consists in a chamber 5 which constitutes the mixing chamber for the water, the said chamber having outlets 6 and 7 which may be separately controlled and which may lead respectively, to an overhead shower spray and a hand spray. The said chamber of course, may be provided with a single outlet, or more than two outlets, leading to any point of consumption which may be desired.

The chamber 5, instead of being directly in communication with the two inlet passages, is provided with a supplemental chamber 8 which is cylindrical in form and provided at its outer end with an annular valve seat 9, the inlet passages 3 and 4 leading directly to said chamber 8, and not being in direct communication with the main chamber 5. This supplemental chamber 8 contains a cylindrical mixing valve 10 which is connected with the compression valve 12 which, when the water is shut off is forced against the annular valve seat 9, the said compression valve having the usual annular washer 13 to engage directly with the valve seat. The mixing valve 10 and the compression valve 12, are mounted on a common stem 14, which is provided with a thread 15, engaging a female thread 16 in a coupling member 17, which is adapted to be screwed into the main casing, as clearly shown in Fig. 2.

The stem 14 extends through the coupling member 17 being made water tight by means of an ordinary packing gland 18, the said stem being provided at the outside with a knob or handle 19 by which the stem can be turned to open or close the valve. By turning the handle, the stem 14 is moved longitudinally, thus withdrawing the valve 12 from the seat 9 and allowing the water to flow from the inlet passages through the supplemental chamber 8, into the chamber 5, and thence through the outlet or outlets from said chamber. The supply of hot and cold water, however, is controlled by mixing member 10, the general shape of which is such as to fit the supplemental chamber 8, there being, however, a pocket or recess 20 formed in said mixing member and extending substantially half way around the same. It is obvious that the member 10, when in such a position that the unrecessed portion thereof lies in front of either of the inlet passages 3 or 4 will close such inlet passage, allowing the water to enter only from the passage which is in communication with the pocket 20.

In the normal closed position of the valve, best shown in Figs. 2 and 6, the cavity 20 is in line with the cold water inlet passage 4, and the solid portion of the mixing member 10 is in a position to close the hot water inlet passage 3. The pocket 20 is of such size, as shown in Fig. 6 that a considerable turning movement of the valve member can take place before the said pocket is put out of communication with the cold water inlet. The construction is such that a quarter turn of the valve stem 14 will carry the compression valve 12 far enough away from its seat 9 to afford a free passage for the water into the chamber 5, and, at the same movement, while changing the position of the cavity 20, will still leave the said cavity in open communication with the cold water inlet. The valve stem 14 and its handle 19 are provided with an indicator member 21 which incidentally constitutes a stop member, as will be hereinafter described, the said indicating member traveling in the turning movement of the valve across the face of the valve casing, which is shown as having thereon the words "cold", "tepid", and "hot". The quarter movement of the valve stem 14 carries the indicator 21 to the part marked "cold", and, in this position of the valve, the cold water passage opens freely into the chamber 5, so that cold water will be delivered therefrom through the passage 6 or the passage 7.

In Fig. 5 the mixing member 10, is shown as in the position assumed when the valve stem 14 is turned to the position where the indicator 21 covers the word "tepid", and, as indicated in Fig. 5, the pocket 20 in this case is in such a position as to receive water from both the cold water inlet 4 and the hot water inlet 3. In this position of the valve, therefore, the hot and cold water mix, supplying the chamber 5 with water of a moderate temperature. A further movement of the valve stem 14 to the position in which the indicator 21 is over the word "hot" causes the mixing member 10 to close the cold water passage 4, as shown in Fig. 7, leaving only the pocket 20 in communication with the hot water inlet 3. To provide for a preliminary adjustment of the valve, the mixing member 10, which is provided with the pocket 20 is movable upon the valve stem 14, so that it can be turned with relation thereto, thereby varying the position of the pocket 20 with relation to the inlet passages. Assuming, for example, that the normal temperature of the hot water in a given installment is relatively low, or assuming that the pressure of the cold water is high with relation to that of the hot, the mixing member 10 can be turned upon the valve stem 14, so that in the position marked "tepid" in Fig. 5 the relative areas of the cold and hot water inlet passages can be varied to bring about the desired result.

In the construction shown, the mixing member 10 is in the form of a sleeve fitting over the stem 14, the outer end of said sleeve being provided with an engaging device such as a pin 22 adapted to enter any one of a series of openings 23 formed in the valve member 12 on the stem 14. After adjustment, the mixing member 10 is held in position by means of a set screw 24 and a nut 25 which is screwed on that end of the stem 14 which projects through the mixing member 10.

The valve embodying the invention is further provided with external adjustable stops 26 and 27 which are adapted to engage the indicator or stop member 21 at the ends of its movement. The stop 26 is adapted to be adjusted to take care of the compression washer 13 on the valve member 12, the purpose of the said stop being to prevent undue wear upon the washer which sometimes ensues when the valve is forced to its seat with unnecessary strength.

The adjustable stop 27 is for the purpose of limiting the movement of the valve when the water is abnormally hot and needs to be somewhat throttled.

What I claim is:

1. A mixing valve having a cylindrical inlet chamber provided at opposite sides with hot and cold water inlets, and at the end with an outlet; a compression cock controlling said outlet, the stem of said cock projecting into said chamber; a cylindrical valve supported on said stem and fitting the inlet-chamber, said valve having a pocket of sufficient capacity to bridge the hot and cold water inlets; and means for adjusting said valve with relation to said stem.

2. A mixing valve having a cylindrical inlet chamber provided at opposite sides with hot and cold water inlets, and at the end with an outlet; a compression cock controlling said outlet, the stem of said cock projecting into said chamber; and the face of the valve member thereof being provided with an annular series of holes; a cylindrical valve fitting the inlet chamber and being sleeved on said stem, said valve having a lateral pocket wider than the distance between the inlet ports; a projection at the end of said valve to engage in any of the holes in the face of the valve member of the compression cock; and a nut to hold said valve longitudinally on said stem.

3. A mixing valve having a cylindrical inlet chamber provided at opposite sides with hot and cold water inlets, and at the end with an outlet; a cylindrical valve fitting said chamber and having a lateral pocket of sufficient capacity to bridge said inlets when the valve is turned on its axis; a rotatable actuating stem for said valve; and means for adjusting said valve on said stem.

4. A mixing valve having a cylindrical inlet chamber provided at opposite sides with hot and cold water inlets, and at the end with an outlet; a cylindrical valve fitting said chamber and having a lateral pocket of sufficient capacity to bridge said inlets when the valve is turned on its axis; a rotatable actuating stem for said valve; means for adjusting said valve on said stem; and an external indicator operated by said actuating stem.

In testimony whereof, I have signed my name to this specification in the presence of two subscribing witnesses.

THOMAS H. KENNEY.

Witnesses:
 JAS. J. MALONEY,
 M. L. MALONEY.